(12) United States Patent
Guo et al.

(10) Patent No.: US 6,696,816 B2
(45) Date of Patent: Feb. 24, 2004

(54) BATTERY CHARGER

(75) Inventors: Yang-Chu Guo, Kunsan (CN);
Ren-Hua Ji, Kunsan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/271,088

(22) Filed: Oct. 15, 2002

(65) Prior Publication Data

US 2003/0193316 A1 Oct. 16, 2003

(30) Foreign Application Priority Data

Apr. 12, 2002 (TW) .................................... 91204877 U (51) Int. Cl.⁷ ............................................. H01M 10/46
(52) U.S. Cl. ....................................................... 320/110
(58) Field of Search ................................ 320/106, 110, 320/107, 116, 120; 429/99, 100

(56) References Cited

U.S. PATENT DOCUMENTS

| D328,889 S | | 8/1992 | Seki |
|---|---|---|---|
| 5,357,185 A | * | 10/1994 | Chen |
| D358,813 S | | 5/1995 | Hellier et al. |
| 5,689,171 A | | 11/1997 | Ludewig |
| 5,742,149 A | * | 4/1998 | Simpson |
| 6,014,010 A | * | 1/2000 | Yao |
| 6,301,106 B1 | * | 10/2001 | Helot et al. |
| 6,348,776 B2 | * | 2/2002 | Kim |
| 6,384,575 B1 | * | 5/2002 | Chen et al. |

OTHER PUBLICATIONS

"NEC Notebook Battery Charger Versa 4000 (OP–570–61002)".,http://www.alancomputech.com/necnotbatcha.html.

* cited by examiner

Primary Examiner—Edward H. Tso
(74) Attorney, Agent, or Firm—Wei Te Chung (57) ABSTRACT

A battery charger (1) for charging different types of battery boards of notebook computers at different time includes a charging box (10), a plug connector (60) for connecting with a power supplying device and a cable (70) connecting the plug connector with the charging box. The charging box includes a base (11), a cover (12) mounted onto the base, a first and a second connectors (20), (40) arranged in the charging box for charging a first and a second battery boards (8), (9), a first and a second circuit boards (30), (50) for electrically connecting with said first and second connectors. The cover has a platform (121) and a protrusion (122) extending from a rear end of the platform. A first and a second openings (1221), (1211) are respectively arranged on a front wall of the protrusion and a top wall of the platform for mating with the battery boards.

20 Claims, 12 Drawing Sheets

BATTERY CHARGER

BACKGROUND OF THE INVENTION

1. Field of the Invention

The present invention is related to a battery charger, and more particularly to a battery charger for charging different types of batter boards used in notebook computers at different time.

2. Description of Related Art

Most of notebook computers usually adopt batter boards to provide spare electric power for the notebook computers. The battery board is inserted into the notebook computer when it is used. When electric power is not enough, the battery board is drawn out from the notebook computer and is charged by a battery charger. However, configurations of the battery boards of different types of notebook computers are usually different, so different types of battery chargers are required for charging different types of battery boards. Sometimes, even if the same type of the notebook computers may adopt different types of battery boards. Hence computer manufacturers have to design different types of battery boards and corresponding battery chargers each for charging a particular battery board. Cost will be down if one battery charger is designed to be able to charge more than one types of battery boards at different time.

Now, there are battery chargers adapted to charge multiple battery boards, for instance, U.S. Pat. Nos. 5,689,171, D358, 813, D328,889, and D402,957 each disclose such a battery charger. Additionally, NEC Corp. brings forth such type of battery charger for charging battery boards. (Related information please refers to http://www.alancomputech.com/necnotbatcha.html). However, these battery chargers are usually designed to charge the battery boards whose configurations are similar and positions of charging ports are almost the same. When configurations of different charging boxes change a lot, these battery chargers can not work.

Hence, it is desirable to provide an improved battery charger to overcome the above-mentioned disadvantages.

SUMMARY OF THE INVENTION

Accordingly, an object of the present invention is to provide a battery charger adapted to charge battery boards whose configurations and positions of charging ports thereof are different, thereby significantly reducing the manufacturing cost.

In order to achieve the object set forth, a battery charger in accordance with the present invention is adapted for connecting with a power supplying device and charging a first and a second battery boards of different configurations at different time. The battery charger comprises a charging box, a plug connector for connecting with an outer power supplying device and a cable connecting the plug connector with the charging box. The charging box comprises a base, a cover mounted onto the base, a first and a second connectors in the charging box for respectively connecting with the first and second battery board and a first and a second circuit boards on which the first and the second connectors are mounted. The first connector includes a first insulative housing and a plurality of first conductive terminals attached to the first insulative housing. The second connector includes a second insulative housing and a plurality of second conductive terminals attached to the second insulative housing, The cover of the charging box has a stepped shape and includes a platform and a protrusion extending from one end of the platform. The protrusion neighboring one side of the platform horizontally defines a first opening for receiving the first connector and a section of the first battery board. The top wall of the platform defines a second opening for receiving the second connector and a section of the second battery board.

Other objects, advantages and novel features of the invention will become more apparent from the following detailed description of the present embodiment when taken in conjunction with the accompanying drawings.

DETAILED DESCRIPTION OF THE INVENTION

Reference will now be made in detail to the present embodiment of the present invention.

Figure 1:
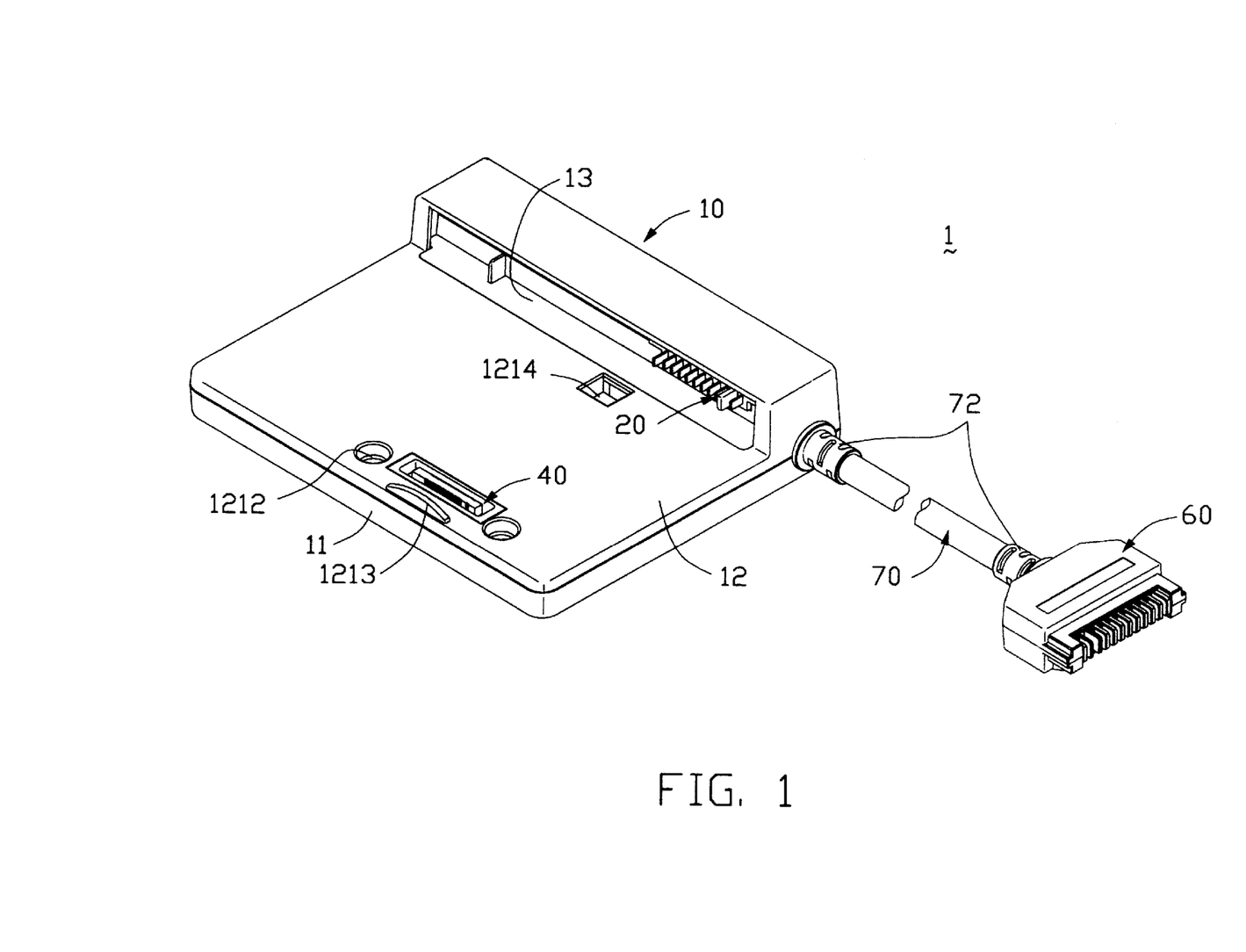
FIG. 1 is a perspective assembled view of a battery charger in accordance with the present invention.

Referring to FIG. 1, a battery charger 1 in accordance with the present invention for charging two different types of battery boards used in notebook computers at different time comprises a charging box 10, a plug connector 60 for connecting with an outer power supplying device (not shown) and a cable 70 for connecting the plug connector 60 with the charging box 10.

Figure 2:
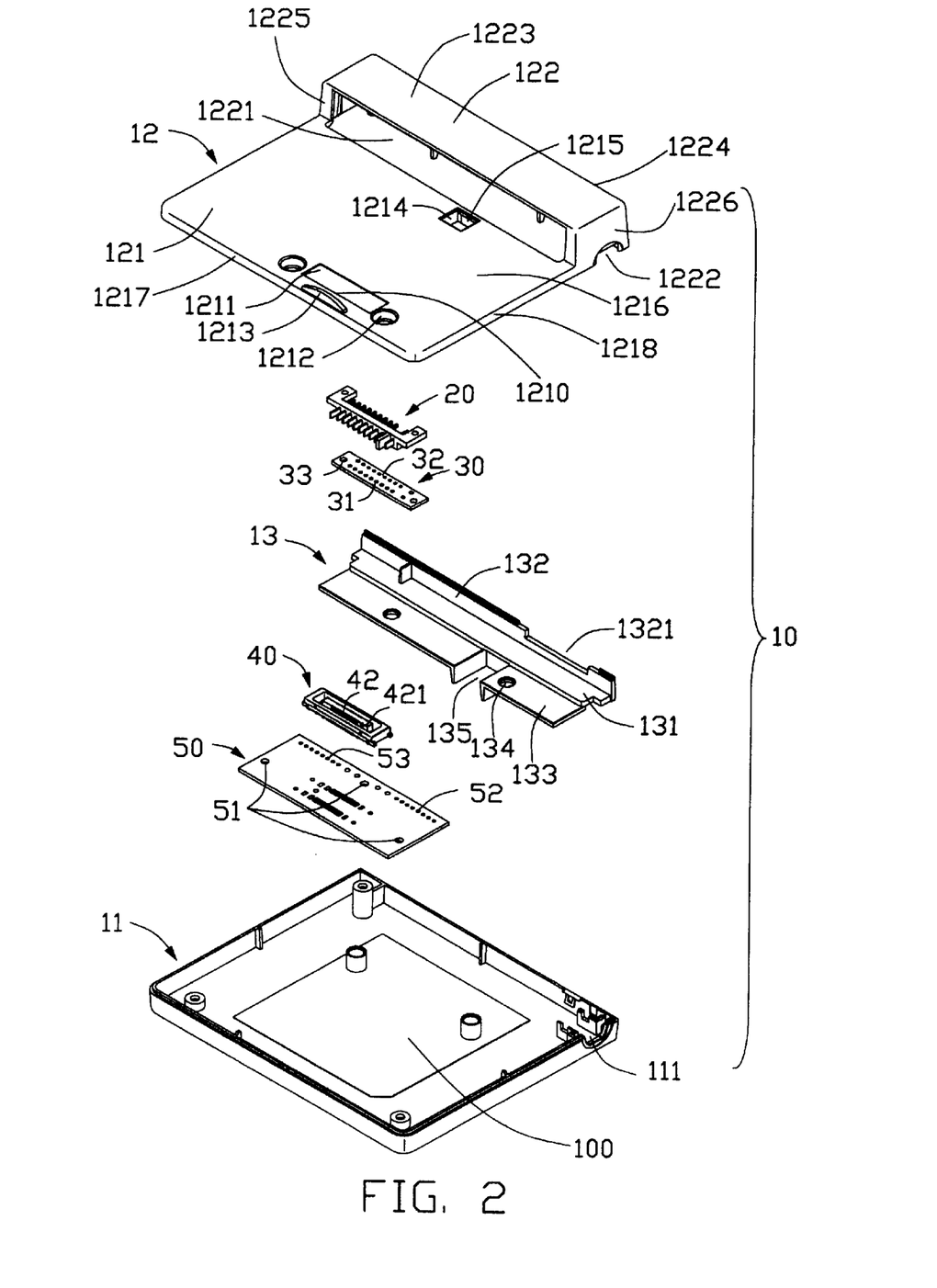
FIG. 2 is an exploded perspective view of the battery charger in FIG. 1 when a plug connector and a cable of the battery charger are removed.

Referring to FIG. 2, the charging box 10 comprises a base 11, a cover 12 mounted onto the base 11, a strengthening piece 13 received in a room 100 defined by the base 11 and the cover 12 for supporting the cover 12, a first and a second connectors 20, 40 for respectively connecting with a first and a second battery boards 8, 9 (FIGS. 9 and 10), a first and a second circuit boards 30, 50 on which the first and second connector 20, 40 are mounted.

Figure 3:
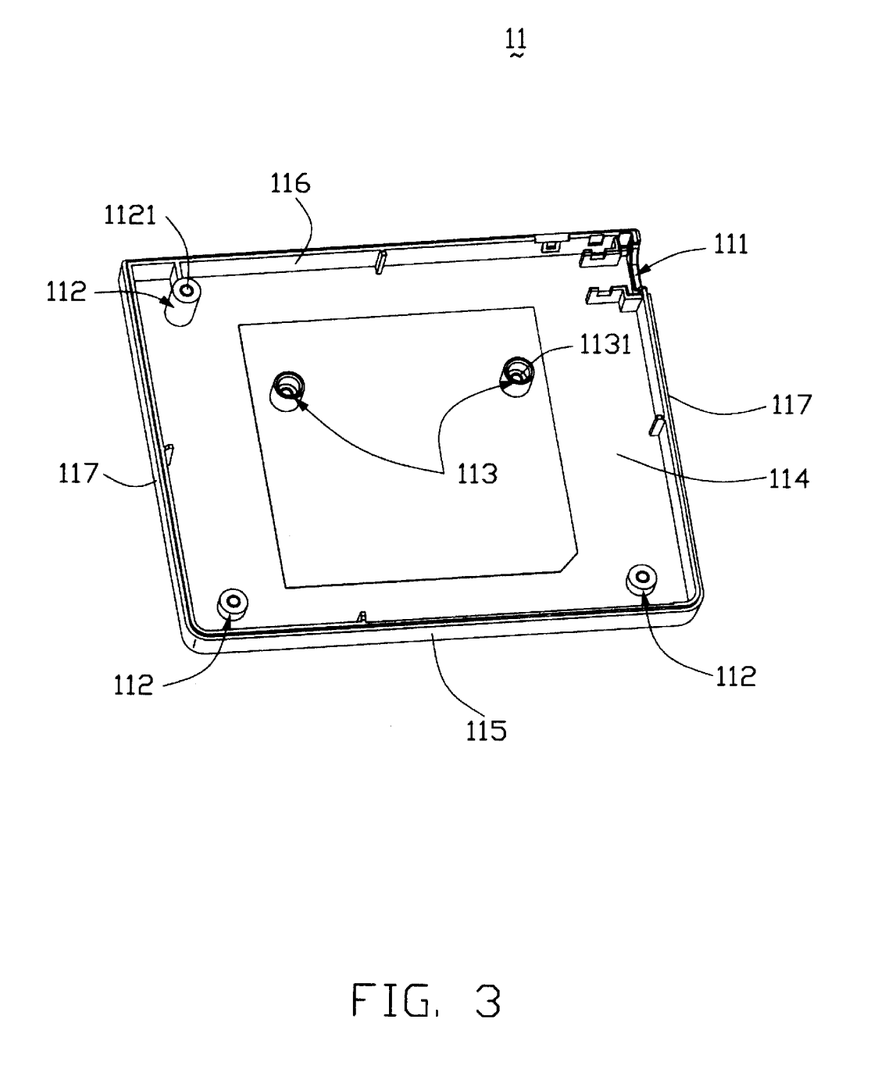
FIG. 3 is a top perspective view of a base of a charging box of the battery charger in FIG. 1.

Referring to FIG. 3, the base 11 has a rectangle shape and has a bottom wall 114, a front wall 115 extending upwardly from the bottom wall 114, a rear wall 116 and two opposite side walls 117. An approximately semicircle aperture 111 is defined near a corner of the base 11. A plurality of cylindrical clasps 112, 113 project upwardly from the bottom wall 114 while three of them respectively locate near three other corners of the base 11 and two of them locate near a center of the base 11. The clasps 112, 113 each define a screwed hole 1121, 1131 for purpose described below.

Figure 4:
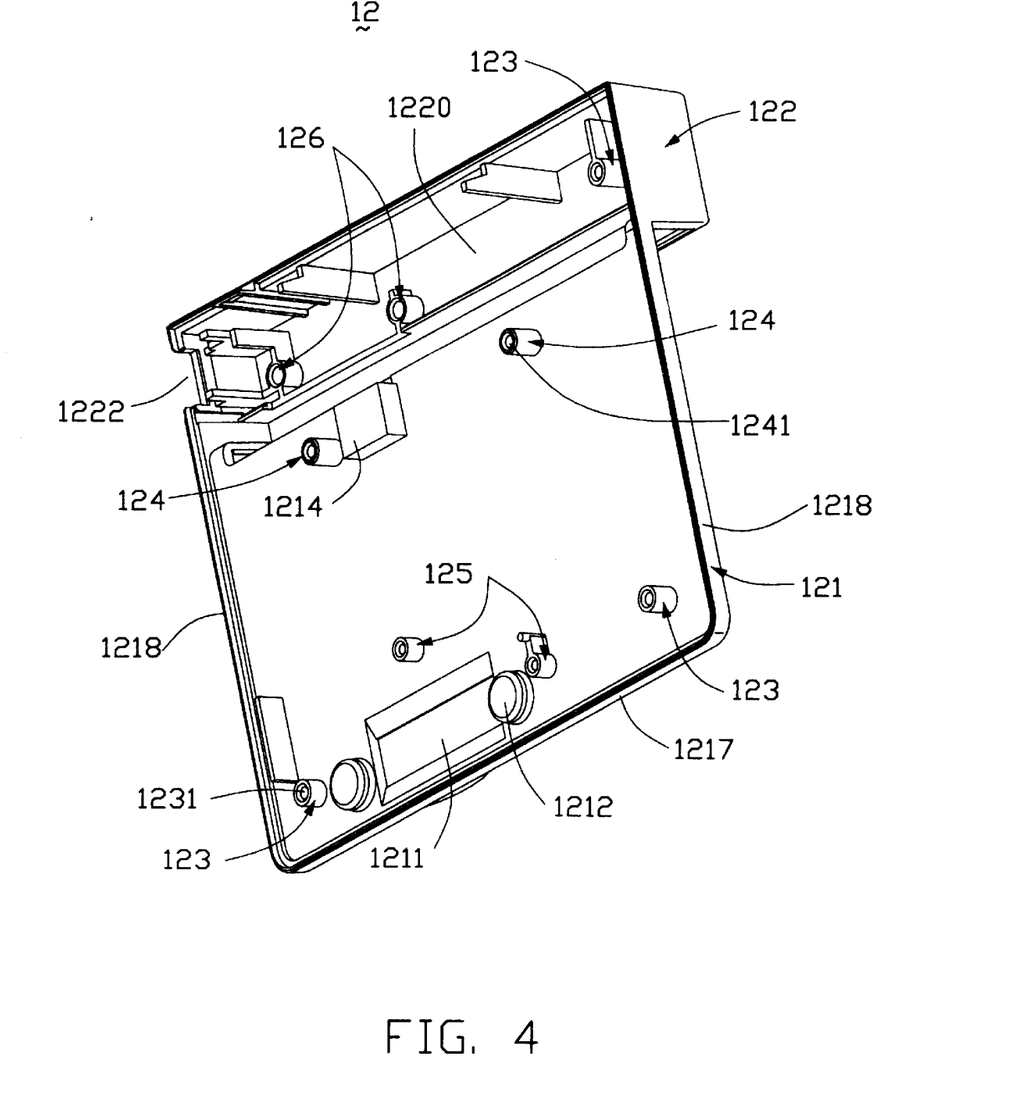
FIG. 4 is a bottom perspective view of a cover of the charging box of the battery charger in FIG. 1.
Figure 8:
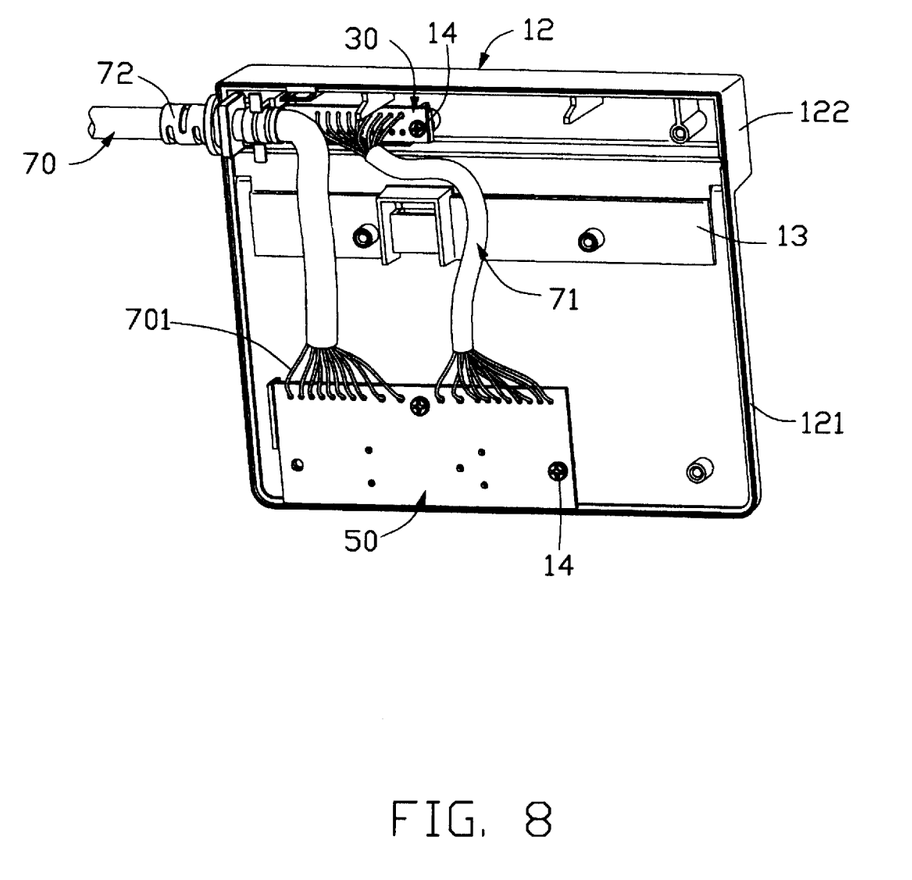
FIG. 8 is a bottom perspective assembled view of the battery charger in FIG. 1 while the plug connector and the base are removed.

Referring to FIGS. 2 and 4, the cover 12 has a stepped shape and includes a platform 121 and a protrusion 122 extending above the platform 121 at a rear side of the platform 121. The platform 121 has a top wall 1216, a front wall 1217 and two opposite side walls 1218 neighboring the top wall 1216. The platform 121 defines an elongated second opening 1211 near the front wall 1217 thereof and a pair of cylindrical depressed hole 1212 adjacent two opposite sides of the second opening 1211. Between a front peripheral wall 1210 of the second opening 1211 and the front wall 1217 of the platform 121, there is an arc emboss 1213 upwardly projecting from the platform 121. The protrusion 122 of the cover 12 has a top wall 1223, a rear wall 1224, a front wall 1225 and two opposite side walls 1226 abutting with the top wall 1223 and the rear wall 1224. The walls define a receiving space 1220 including a first opening 1221 in the front wall 1225 of the protrusion 122 for receiving a side of the first battery board 8. Additionally, a rear portion of the platform 121 neighboring the first opening 1221 provides a rectangular downwardly depressed portion 1214 which defines an aperture 1215 in a rear side thereof communicating the room 100. The cover 12 defines a semicircle aperture 1222 corresponding to the semicircle aperture 111. When the base 11 and the cover 12 are assembled together, the two semicircle apertures 111, 1222 defines a circle aperture for exit of the cable 70. The bottom surface of the platform 121 of the cover 12 defines cylindrical clasps 123, 124 corresponding to the clasps 112, 113 of the base 11 and each of the clasps defines a screwed hole 1231, 1241. Therefore, the cover 12 and the base 11 may be joined together by screws 14 in the screwed holes 1231, 1241 (FIG. 8). It should be noted that outer diameter of the clasps 124 is substantially equal to that of the screwed holes 1131 of the clasps 113 such that the clasps 124 may fixedly received in the respective screwed holes 1131. In addition, two clasps 125 are defined beside the second opening 1211, and the clasps 125 and one of the clasps 123 of the top corner of the cover 12 neighboring the second opening 1211 are disposed in the form of a isosceles triangle. A pair of clasps 126 is defined downwardly extending from the front end of the lower surface of the top wall 1223 of the protrusion 122.

Referring to FIG. 2 again, the strengthening piece 13 is located at the joint of the platform 121 and the protrusion 122 of the cover 12. The strengthening piece 13 has a base plate 131, a perpendicular plate 132 extending vertically and upwardly from the rear end of the base plate 131 and a pair of supporting plates 133 defined in the front end of the base plate 131. There is an interval between the pair of supporting plates 133. The supporting plates 133 in the interval area and the base plate 131 extend vertically and downwardly and form wall faces integrally and the wall faces form a space 135 for receiving the hole walls extending downwardly from the rectangular depressed portion 1214 of the platform 121. One side of the top of the perpendicular plate 132 defines an indentation 1321 for clamping the first connector 20. Each of the supporting plate 133 defines such a screwed hole 134 that the strengthening piece 13 may be attached to the clasps 124 of the cover 12 by screws 14.

Figure 5:
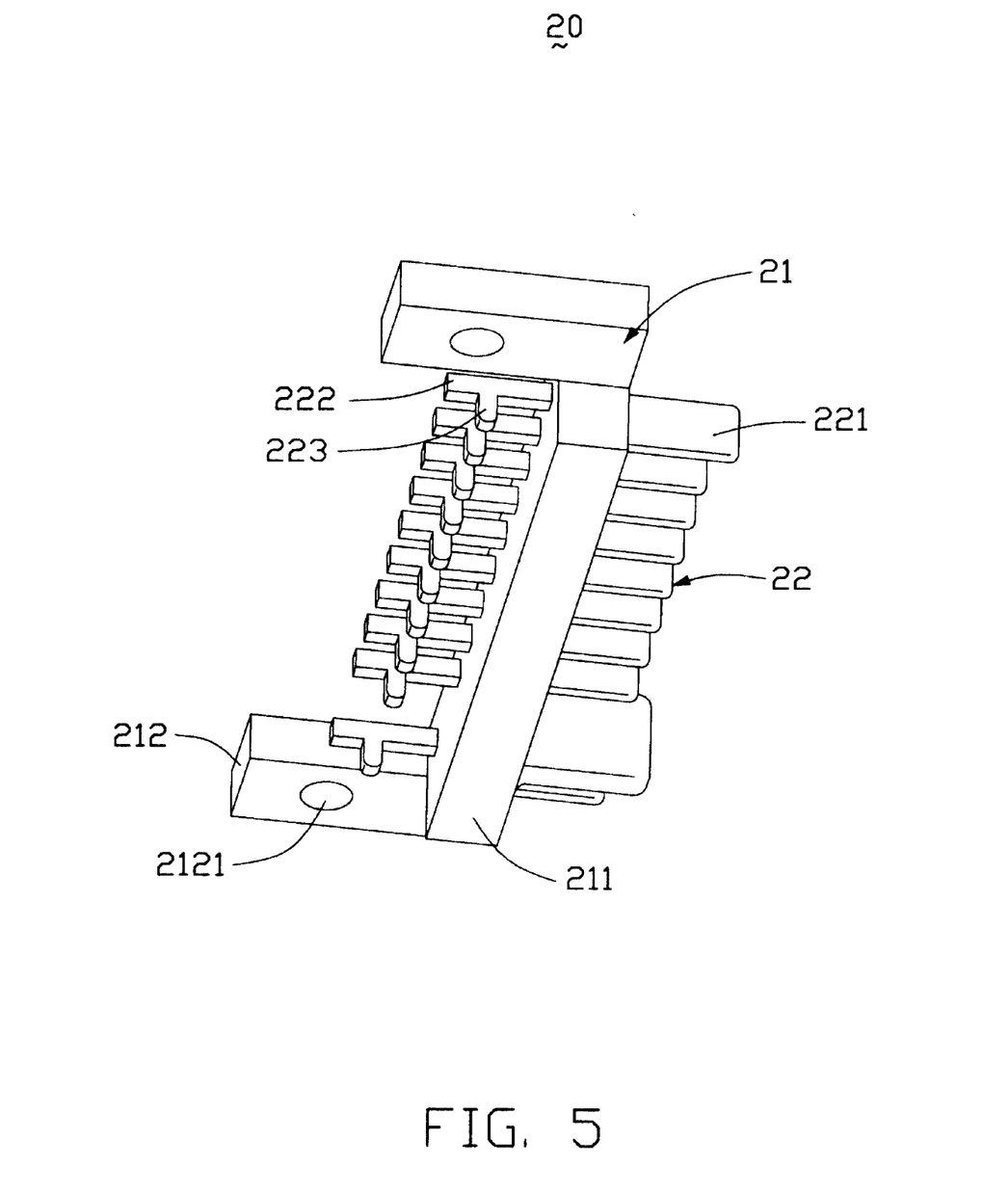
FIG. 5 is a bottom perspective assembled view of a first connector of the battery charger in FIG. 1.

Referring to FIG. 5, the first connector 20 includes a first insulative housing 21 and a plurality of first conductive terminals 22 attached to the housing 21. The first insulative housing 21 includes a base portion 211 and a pair of arm portions 212 extending outwardly and backwardly from two sides of the base portion 211. Each of the arm portions 212 defines a through hole 2121. The first conductive terminal 22 is insert molded in the base portion 211 of the first insulative housing 21 and includes a first contacting portion 221 projecting from the front end of the base portion 211, an extending portion 222 extending from a rear side of the base portion 211 and a first soldering portion 223 downwardly projecting from the middle of the extending portion 222.

Referring to FIGS. 2 and 5, the first circuit board 30 for electrically connecting with the first connector 20 longitudinally defines a front and a rear row of through holes 31, 32 plated with conductive material. The number of each row of through holes 31, 32 is equal to that of the first conductive terminals 22. The first soldering portions 223 of the first conductive terminals 22 are soldered into the front row of through holes 31 of the first circuit board 30 by through hole soldering technology. Two ends of the first circuit board 30 define such a pair of through holes 33 that the first circuit board 30 may be attached to the arm portions 212 of the first insulative housing 21 by the screws 14. Then the first connector 20 is clamped in the indentation 1321 of the perpendicular plate 132 of the strengthening piece 13 and the first contacting portions 221 of the first conductive terminals extend into the first opening 1221.

Figure 6:
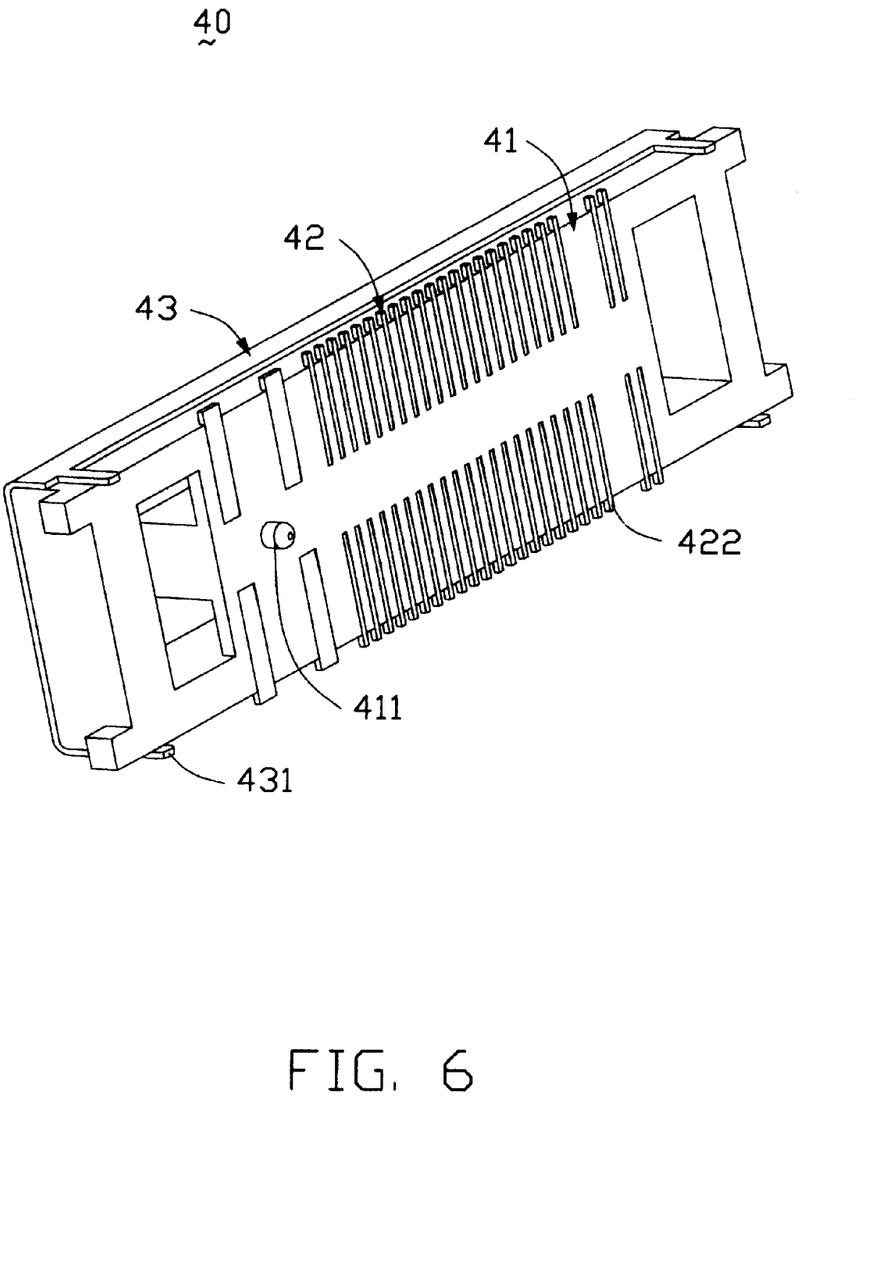
FIG. 6 is a bottom perspective assembled view of a second connector of the battery charger in FIG. 1.

Referring to FIG. 6, the second connector 40 includes a second insulative housing 41, a plurality of second conductive terminals 42 and a shielding shell 43 enclosing the second insulative housing 41. The bottom of the second insulative housing 41 defines an orientation post 411. The shielding shell 43 extends downwardly leg portions 431. The second conductive terminal 42 includes a second contacting portion 421 (shown in FIG. 2) retained into the second insulative housing 41 and a second soldering portion 422 extending from two sides of the bottom of the second insulative housing 41 and for being soldered onto the second circuit board 50 by SMT.

Referring to FIG. 2 again, the second circuit board 50 defines through holes (not labeled) for accommodating the orientation post 411 and the leg portions 431, therefore ensuring true position of the second connector 40 mounted onto the second circuit board 50. Three through holes 51 disposed in the form of a isosceles triangle are defined in the two sides and the middle of the rear side of the second circuit board 50 for clamping with the clasps 123, 125 located in the bottom of the cover 12 and disposed in the form of a isosceles triangle likewise, which causing the second circuit board 50 to steadily connect with the platform 121 of the cover 12 by means of the screws 14. At this time, the top of the second connector 40 mounted onto the second circuit board 50 is received into the second opening 1211 defined in the top wall 1216 of the platform 121. Moreover, the rear side edge of the second circuit board 50 defines two sets of through holes 52, 53 in alignment. The number of each set of through holes is equal to that of each row of through holes 31, 32 in the first circuit board 30.

Figure 7:
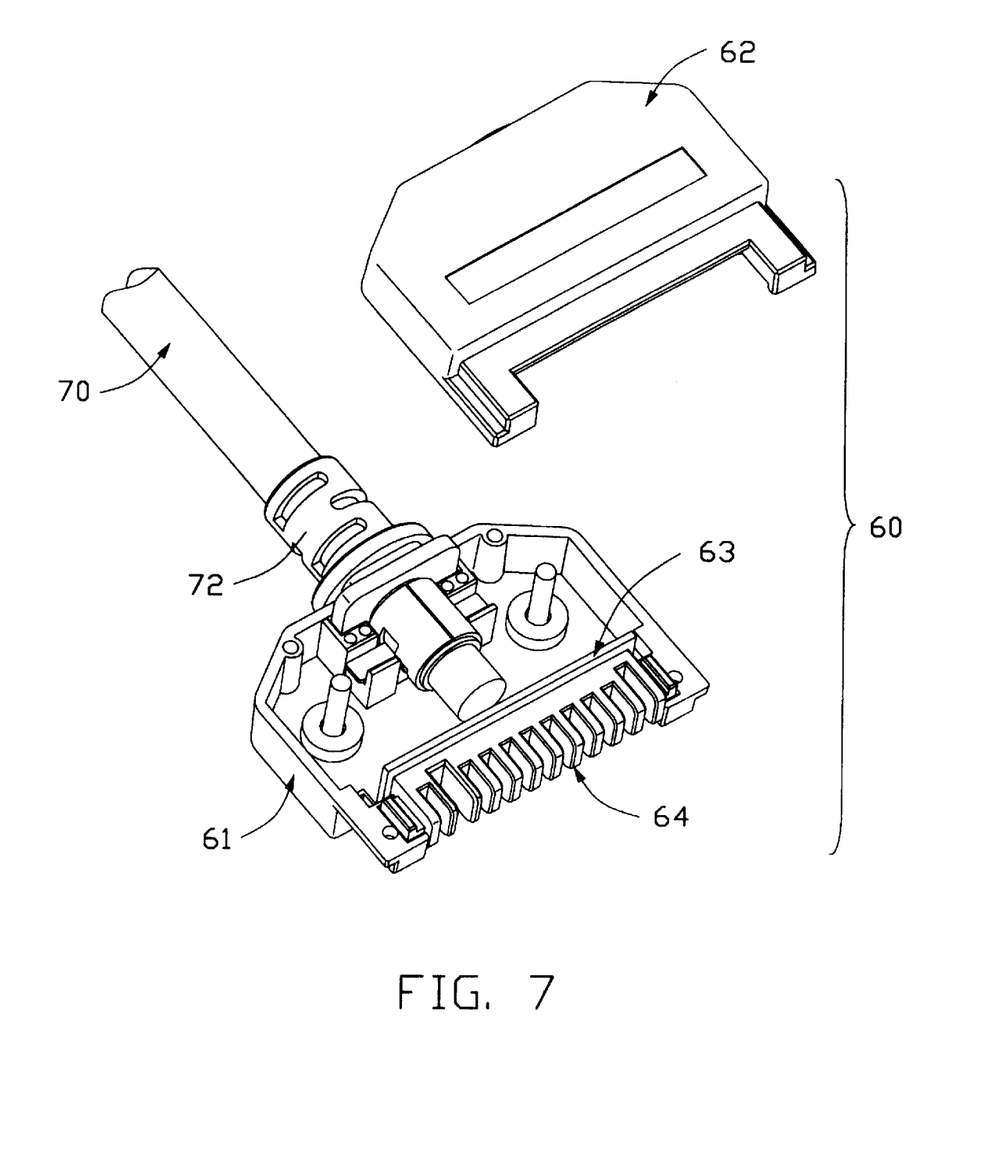
FIG. 7 is a partially exploded perspective view of the plug connector of the battery charger in FIG. 1.

Referring to FIG. 7, the plug connector 60 includes a base 61, a cover 62 mounted onto the base 61, an inner circuit board 63 received in the base 61 and a terminal module 64 defined in the inner circuit board 63.

Referring to FIG. 8 in conjunction with FIG. 7, the cable 70 has a plurality of wires 701, one ends of which are soldered onto the inner circuit board 63 in the plug connector 60 and the other ends are soldered onto the second circuit board 50 in the charging box 10. The cable 70 includes a casing 72 near the plug connector 60 and the charging box 10 for providing the function of stress relief and protecting the cable 70. Another cable 71 is used in the charging box 10 for electrically connecting the other set of through holes 53 in the second circuit board 50 with the rear row of through holes 32 of the first circuit board 30.

Figure 9:
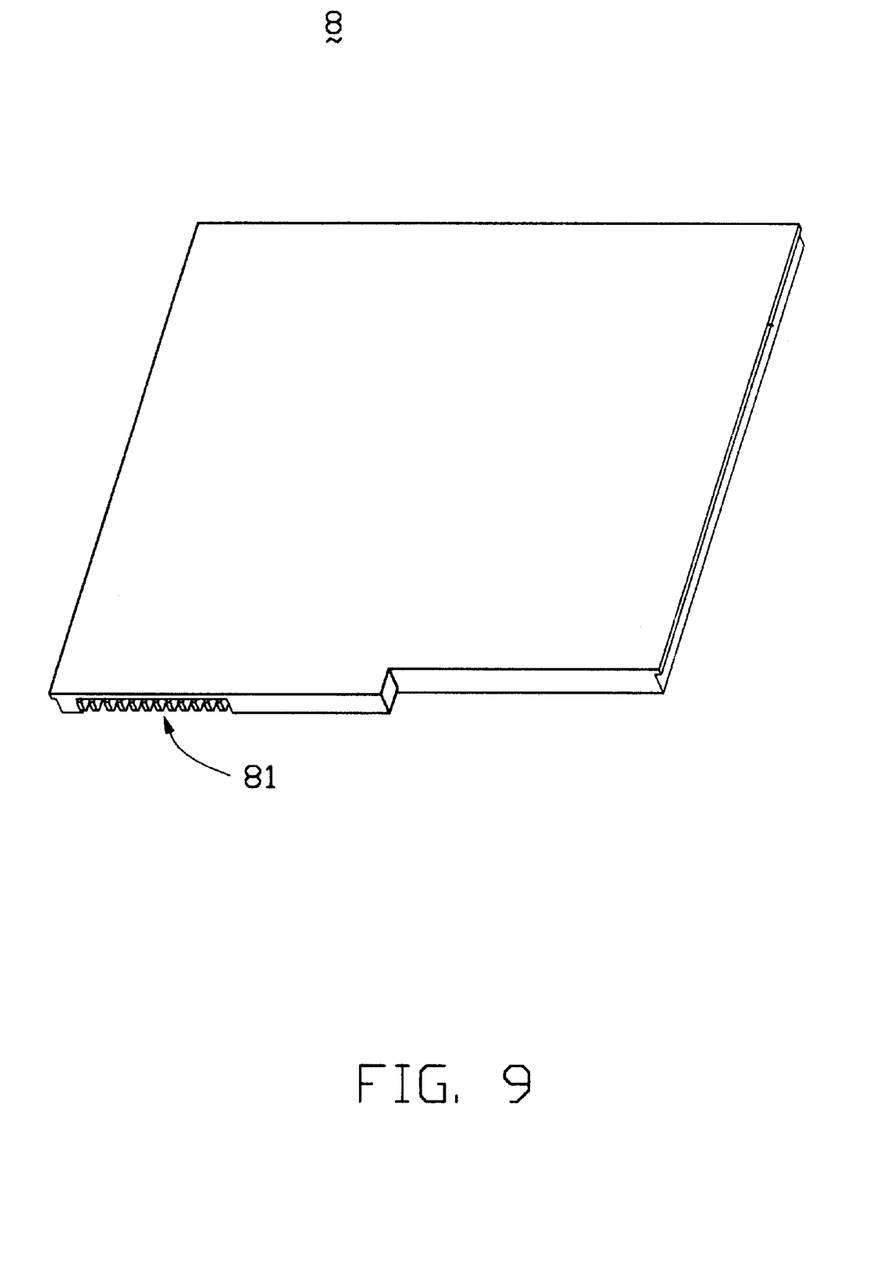
FIG. 9 is a perspective view of a first type of battery board used in a notebook computer.
Figure 11:
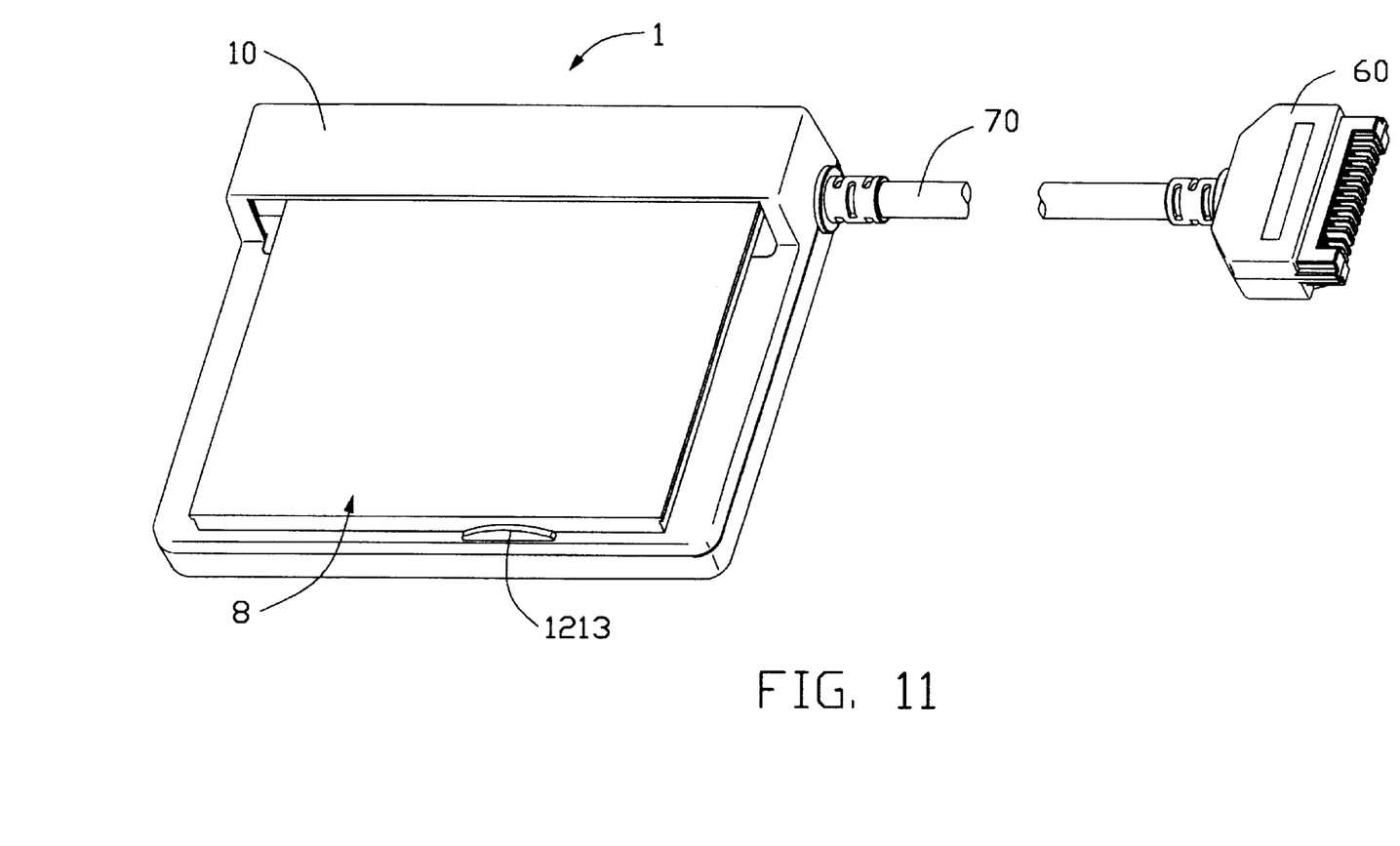
FIG. 11 is a top perspective view of the battery charger assembly while the first type of battery board of FIG. 9 mates with the battery charger.

Referring to FIGS. 9 and 11, when the first battery board 8 is charged, a charging port 81 thereof is partially inserted into the first opening 1221 of the protrusion 122 of the charging box 10. The charging port 81 electrically connects with the first contacting portions 221 of the first conductive terminals 22 of the first connector 20. The main body of the battery board 8 is flatly placed on the cover 12 of the charging box 10 and is prevented from moving forward and backward relative to the charging box 10 by the arc emboss 1213 of the front side of the platform 121, hence ensures a reliable and electrical connection when the first battery board 8 is charged.

Figure 10:
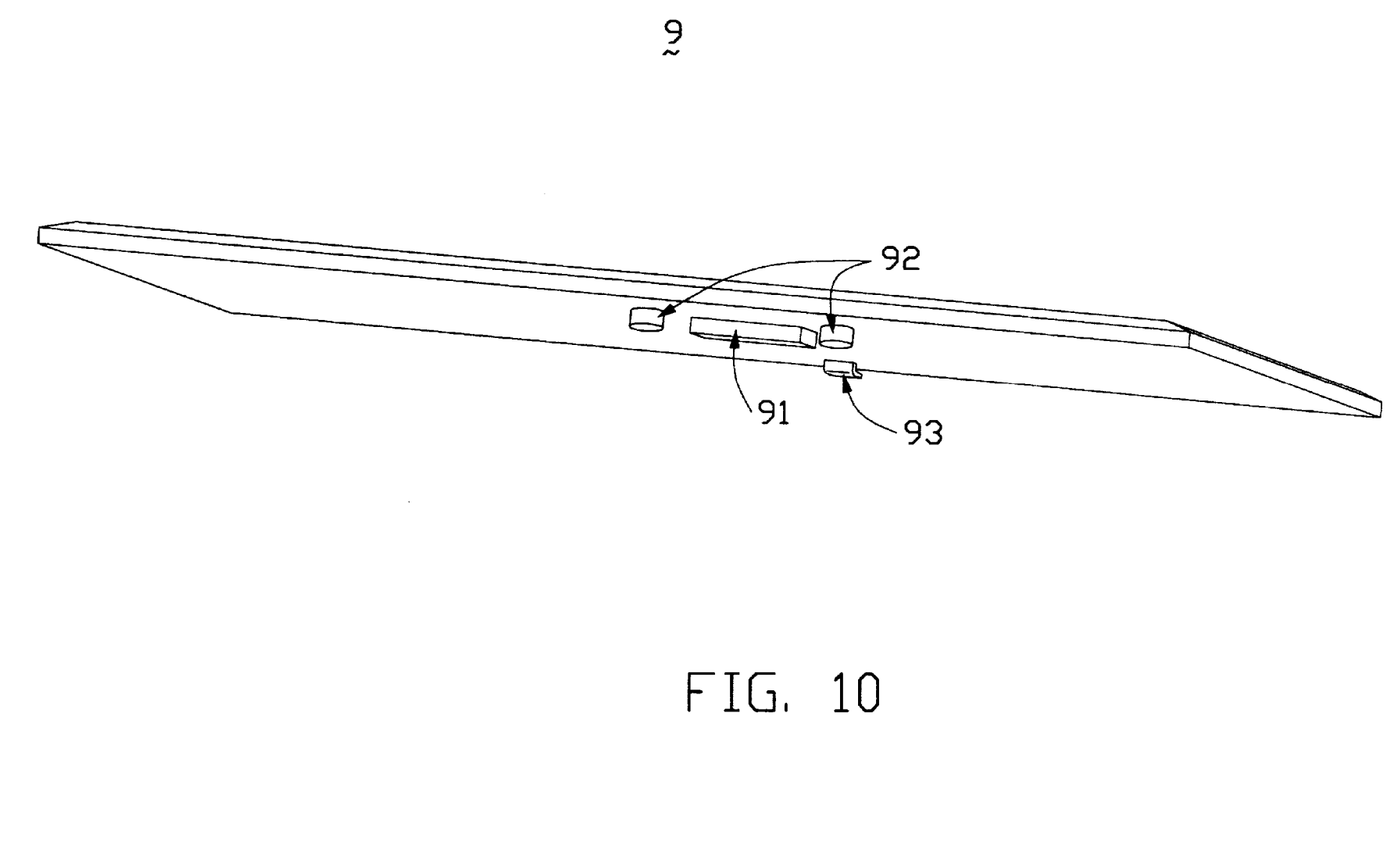
FIG. 10 is a perspective view of a second type of battery board used in a notebook computer.
Figure 12:
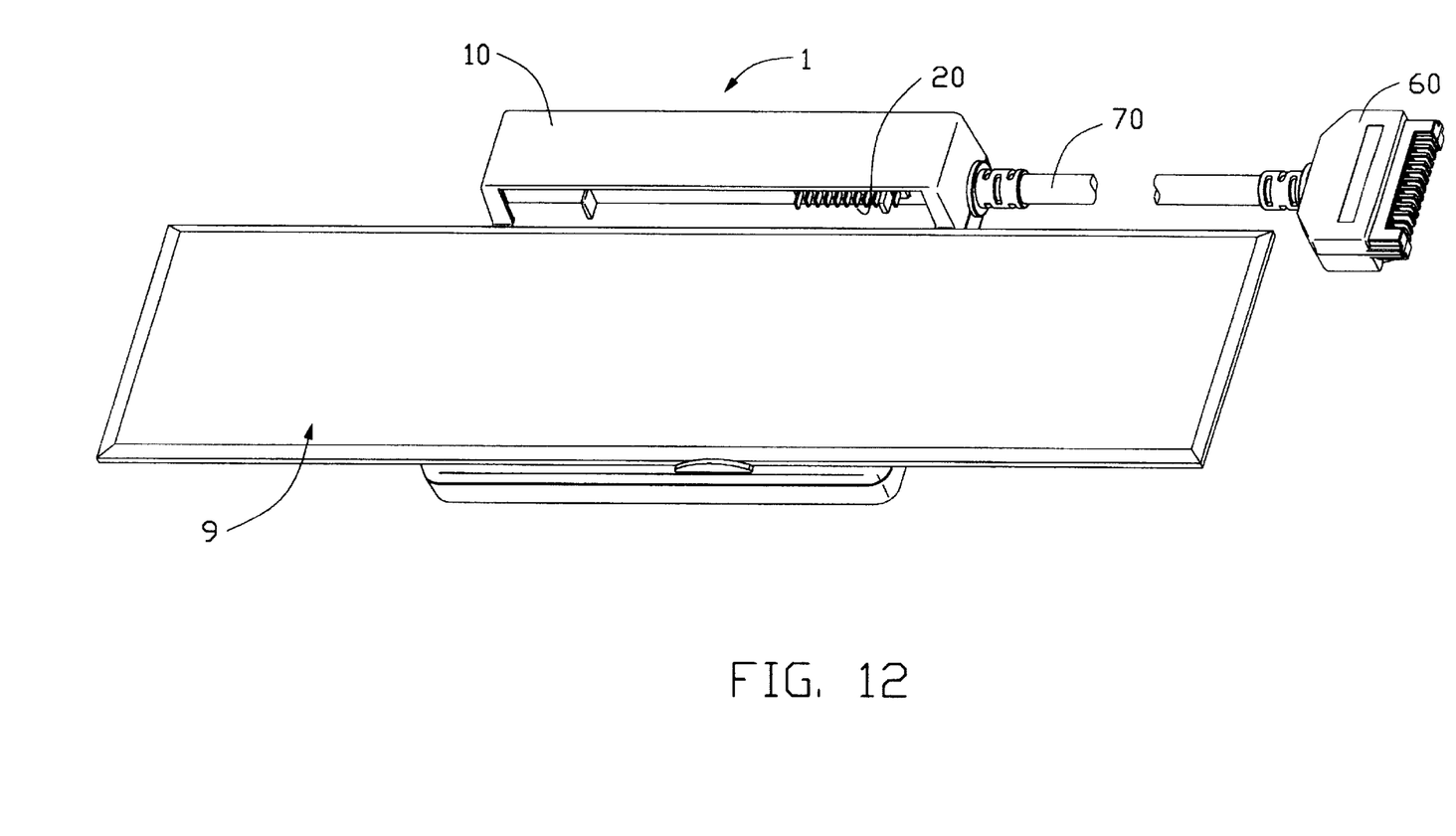
FIG. 12 is similar to FIG. 11 except that the second type of battery charger of FIG. 10 mates with the battery charger.

Referring to FIGS. 10 and 12, when the second battery board 9 is charged, a hook 93 located in a rear side of the bottom thereof is placed in the rectangular depressed portion 1214 of the platform 121 of the battery charger 1 and slides backwardly into the aperture 1215 of the rear side of the depressed portion 1214. Columniform posts 92 of two sides of a charging port 91 located in a front side of the bottom of second circuit board 9 are received in corresponding cylindrical depressed hole 1212 of the platform 121 so that the charging part 91 may securely mate with the second connector 40. The main body of the battery board 9 is flatly placed on the platform 121 of the battery charger 1. Therefore, the battery charger 1 can charge at least two different types of battery boards at different time, so it's economical.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery charger for connecting with a power supplying device and charging at least two different types of first and second battery boards at different time, comprising:
   a charging box comprising:
      a base and a cover mounted onto the base, the cover having a stepped shape and comprising a platform and a protrusion upwardly extending from one end of the platform, the protrusion defining a first opening and the platform defining a second opening;
      a first connector and a second connector respectively received in the first opening and the second opening for respectively connecting with a first battery board and a second battery board at different time, the first connector having a first insulative housing and a plurality of first conductive terminals attached to the first insulative housing, the second connector having a second insulative housing and a plurality of second conductive terminal attached to the second insulative housing; and
      a first circuit board and a second circuit board on which the first connector and the second connector are respectively mounted;
   a plug connector for connecting with a power supplying device; and
   a cable connecting the plug connector with the charging box.

2. The battery charger as claimed in claim 1, wherein the platform defines a pair of cylindrical depressed hole at two opposite sides of periphery of the second opening and the platform provides an arc emboss at a front edge thereof.

3. The battery charger as claimed in claim 1, wherein the rear portion of the platform defines a rectangular depressed portion neighboring the first opening and a rear side of the depressed portion defines an aperture.

4. The battery charger as claimed in claim 1, wherein one side of the charging box defines a circle aperture for exit of the cable.

5. The battery charger as claimed in claim 1, wherein said charging box further comprises a strengthening piece mounted at an interconnection of the platform and the protrusion of the cover for supporting the cover.

6. The battery charger as claimed in claim 5, wherein said strengthening piece comprises a base plate, a perpendicular plate upwardly extending from a rear end of the base plate and a pair of supporting plates at a front end of the base plate, the perpendicular plate defining an indentation at one side thereof.

7. The battery charger as claimed in claim 6, wherein said first connector is clamped in the indentation of said perpendicular plate and the first contacting portion of said first conductive terminals extend outside the perpendicular plate.

8. The battery charger as claimed in claim 1, further comprising another cable for connecting the first circuit board with the second circuit board.

9. A battery charger comprising:
   a charger box;
   a printed circuit board disposed in the box;
   spaced first and second connectors located at different positions of the box;
   said first connector facing in a first direction,
   said second connector facing in a second direction essentially perpendicular to said first direction;
   an upward platform provided on the box and adapted to exclusively supportably hold a first battery board electrically connected to the box via said first connector or a second battery board electrically connected to the box via the second connector.

10. The charger as claimed in claim 9, further including first and second securing devices for respectively exclusively fixing the first and the second battery boards to the box.

11. The charger as claimed in claim 9, wherein at least one of said first and second direction is perpendicular to said platform.

12. The charger as claimed in claim 11, wherein there is at least one depressed hole in the platform for receipt of a post of the corresponding connector which is coupled to the corresponding connector facing in said one direction.

13. The charger as claimed in claim 9, further including another printed circuit board which cooperates with the printed circuit board to provide circuits connected to the first connector and the second connector, respectively.

14. A battery charger assembly comprising:
   a charger box with at least one printed circuit board therein;
   a platform provided on the box;
   spaced first and second connectors arranged on the box, said first connector facing in a first direction perpendicular to said platform while the second connector facing in a second direction parallel to said platform; and first and second battery boards mutually exclusively mounted on the platform; wherein said first battery board is assembled unto the platform along the first direction, and the second battery board is assembled unto the platform along the second direction perpendicular to said first direction.

15. The assembly as claimed in claim 14, wherein said box includes a first securing device preventing withdrawal of the first battery board in a direction opposite to the first direction.

16. The assembly as claimed in claim 14, wherein said box includes a second securing device preventing withdrawal of the second battery board in a direction opposite to the second direction.

17. The assembly as claimed in claim 14, wherein said box includes a first securing device preventing withdrawal of the first battery board in a direction opposite to the first direction, wherein said box includes a second securing device preventing withdrawal of the second battery board in a direction opposite to the second direction, and said first securing device is spaced/discrete from said second securing device.

18. The assembly as claimed in claim 14, further including another printed circuit board which cooperates with the printed circuit board to provide circuits connected to the first connector and the second connector, respectively.

19. The assembly as claimed in claim 14, wherein said first battery board includes at least one post adapted to be received in a depressed hole in the platform.

20. The assembly as claimed in claim 19, wherein said depressed hole is close to the first connector.

* * * * *